United States Patent
Fujishima

(10) Patent No.: US 12,261,304 B2
(45) Date of Patent: Mar. 25, 2025

(54) MANUFACTURING METHOD OF POWER STORAGE DEVICE

(71) Applicant: TOYOTA JIDOSHA KABUSHIKI KAISHA, Toyota (JP)

(72) Inventor: Seigo Fujishima, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 18/196,621

(22) Filed: May 12, 2023

(65) Prior Publication Data
US 2024/0030459 A1    Jan. 25, 2024

(30) Foreign Application Priority Data

Jul. 20, 2022    (JP) .................................. 2022-115470

(51) Int. Cl.
*H01M 4/82* (2006.01)
*H01M 4/66* (2006.01)

(52) U.S. Cl.
CPC ............. *H01M 4/82* (2013.01); *H01M 4/661* (2013.01); *H01M 4/667* (2013.01); *H01M 4/668* (2013.01)

(58) Field of Classification Search
CPC ....... H01M 4/661; H01M 4/667; H01M 4/668
USPC ...................................................... 156/275.5
See application file for complete search history.

(56) References Cited

U.S. PATENT DOCUMENTS

| | | | |
|---|---|---|---|
| 10,693,175 B2 * | 6/2020 | Sugimoto | ............... H01M 4/26 |
| 2005/0208361 A1 | 9/2005 | Enjoji et al. | |
| 2010/0101720 A1 | 4/2010 | Sekihara et al. | |
| 2013/0192751 A1 | 8/2013 | Arai et al. | |

FOREIGN PATENT DOCUMENTS

| | | |
|---|---|---|
| JP | 2005-297288 A | 10/2005 |
| JP | 2012-056308 A | 3/2012 |
| JP | 2020-095909 A | 6/2020 |
| JP | 2021-082450 A | 5/2021 |
| WO | 2008/117717 A1 | 10/2008 |

* cited by examiner

*Primary Examiner* — James D Sells
(74) *Attorney, Agent, or Firm* — Oliff PLC

(57) ABSTRACT

A manufacturing method of a power storage device includes: an arrangement step of arranging a first resin member on a first surface of a metal foil and arranging a second resin member on a second surface of the metal foil; and a welding step of arranging a first pressurizing member and a second pressurizing member on a surface on an opposite side of the first resin member and the second resin member, respectively, from a surface on the metal foil side, and irradiating the end portion of the metal foil with an electromagnetic wave from the first pressurizing member side while pressurizing the end portion with the first pressurizing member and the second pressurizing member so as to weld the first resin member and the second resin member to the metal foil such that the end portion of the metal foil is covered.

3 Claims, 2 Drawing Sheets

MANUFACTURING METHOD OF POWER STORAGE DEVICE

CROSS-REFERENCE TO RELATED APPLICATION

This application claims priority to Japanese Patent Application No. 2022-115470 filed on Jul. 20, 2022 incorporated herein by reference in its entirety.

BACKGROUND

1. Technical Field

The present disclosure relates to a manufacturing method of a power storage device including a step of welding resin to metal.

2. Description of Related Art

Conventionally, a laser bonding method of metal and resin has been known. For example, Japanese Unexamined Patent Application Publication No. 2012-56308 (JP 2012-56308 A) discloses a method of bonding metal and resin by pressurizing a bonding portion of the metal and the resin with a pressurizing member and performing laser irradiation.

SUMMARY

A structure of covering an end portion of a metal member with a resin member to suppress corrosion and rust of the metal member is known. When such a structure is manufactured by using the above-described laser bonding method, when the metal member is a thin metal foil, there is a case in which the resin member is welded to the pressurizing member on the opposite side of the laser irradiation side and the product cannot be taken out.

The present disclosure has been made in view of the above circumstances. An object of the present disclosure is to provide a manufacturing method of a power storage device in which in a step of covering an end portion of a metal foil with a resin member, the resin member can be welded to the metal member so as to cover the end portion of the metal member by irradiation of an electromagnetic wave from one surface of the metal member, while welding of the resin member to the pressurizing member is suppressed.

1

A manufacturing method of a power storage device, the manufacturing method including: an arrangement step of arranging a first resin member that contains a thermoplastic resin and that transmits an electromagnetic wave, on a first surface of a metal foil with a thickness of 1 μm or more and 100 μm or less, the first resin member being arranged such that an end portion of the first resin member is longer than an end portion of the metal foil, and arranging a second resin member that contains a thermoplastic resin and that transmits an electromagnetic wave, on a second surface of the metal foil, the second resin member being arranged such that an end portion of the second resin member is longer than the end portion of the metal foil; and a welding step of arranging a first pressurizing member that transmits an electromagnetic wave on a surface on an opposite side of the first resin member from a surface on the metal foil side, arranging a second pressurizing member that transmits an electromagnetic wave on a surface on an opposite side of the second resin member from a surface on the metal foil side, and irradiating the end portion of the metal foil with an electromagnetic wave from the first pressurizing member side while pressurizing the end portion with the first pressurizing member and the second pressurizing member so as to weld the first resin member and the second resin member to the metal foil such that the end portion of the metal foil is covered.

2

The manufacturing method according to claim 1, in which in the arrangement step, a distance between the end portion of the metal foil and the end portion of the first resin member and a distance between the end portion of the metal foil and the end portion of the second resin member are equal to or greater than 0.5 mm.

3

The manufacturing method according to 1 or 2, in which the metal foil is a current collector of a battery.

In the present disclosure, the resin member can be welded to the metal member so as to cover the end portion of the metal member by the irradiation of the electromagnetic wave from one surface of the metal member, while welding of the resin member to the pressurizing member is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1A:
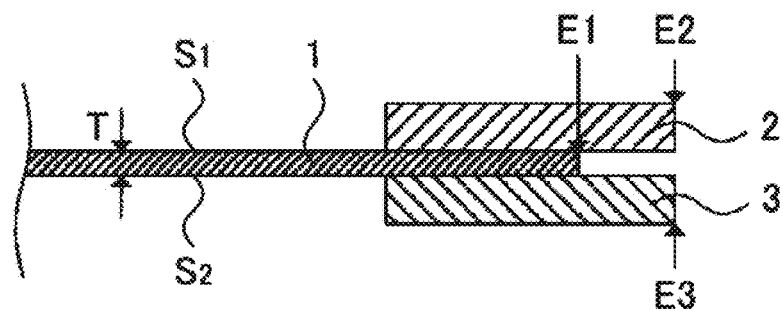
FIG. 1A is a schematic cross-sectional view illustrating an arrangement step and a welding step in the present disclosure.

Hereinafter, a manufacturing method of a power storage device according to the present disclosure will be described in detail with reference to the drawings. The figures shown below are shown schematically. In the drawings shown below, the size and shape of each part are appropriately exaggerated for ease of understanding. In addition, in the present specification, when expressing a mode in which another member is disposed with respect to a certain member, when simply referred to as "on" or "below", unless otherwise specified, it includes both a case in which another member is disposed directly above or directly below a certain member so as to be in contact with the certain member, and a case in which another member is disposed above or below a certain member via another member.

Figure 1B:
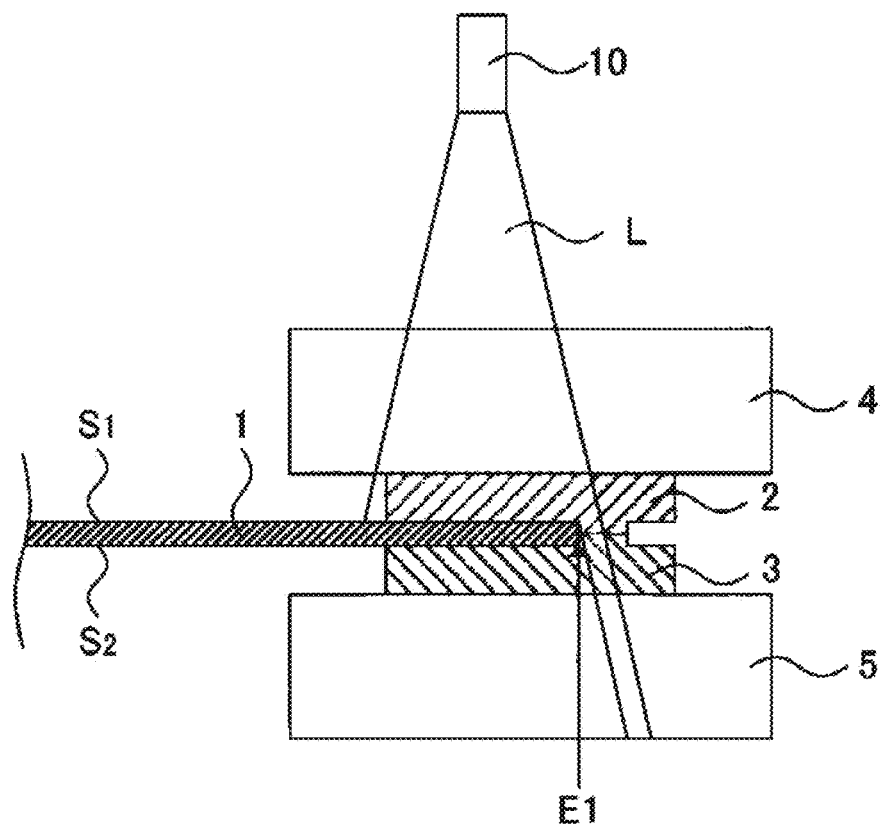
FIG. 1B is a schematic cross-sectional view illustrating a arrangement step and a welding step in the present disclosure.
Figure 1C:
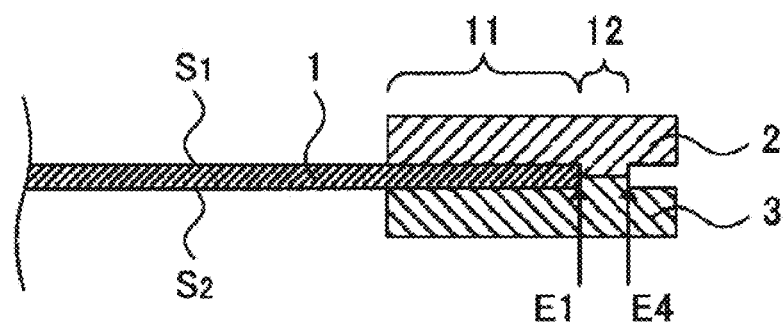
FIG. 1C is a schematic cross-sectional view illustrating a arrangement step and a welding step in the present disclosure.

FIG. 1A, FIG. 1B, and FIG. 1C are schematic cross-sectional views illustrating the arrangement step and welding step disclosed herein. First, as shown in FIG. 1A, in the arrangement step, the first resin member 2 that contains a thermoplastic resin and transmits an electromagnetic wave is disposed on the first surface $S_1$ of the metal foil 1. At this time, the first resin member 2 is disposed so that the end E2 of the first resin member 2 is longer than the end portion E1 of the metal foil 1. In addition, a second resin member 3 containing a thermoplastic resin and transmitting an electromagnetic wave is disposed on the second surface $S_2$ of the metal foil 1. At this time, the second resin member 3 is disposed so that the end E3 of the second resin member 3 is longer than the end portion E1 of the metal foil 1. The thickness T of the metal foil 1 is within a predetermined range. Next, as shown in FIG. 1B, in the welding step, the first pressurizing member 4 that transmits the electromagnetic wave is disposed on the surface of the first resin member 2 that faces away from the metal foil 1. Further, the second pressurizing member 5 that transmits the electromagnetic wave is disposed on the surface of the second resin member 3 opposite to the surface on the metal foil 1 side. The metal foil 1 is irradiated with electromagnetic waves from the first pressurizing member 4 side while being pressurized by the first pressurizing member 4 and the second pressurizing member 5. In the illustrated 1B, the laser beam L is irradiated from the laser head 10 as an electromagnetic wave. At this time, the area including the end portion E1 of the metal foil 1 is irradiated with the laser beam L. The metal foil 1 absorbs electromagnetic waves and generates heat. Since the first resin member 2 and the second resin member 3 are pressurized by the first pressurizing member 4 and the second pressurizing member 5, respectively, they are in close contact with the metal foil 1. Therefore, heat of the metal foil 1 is conducted to the first resin member 2 and the second resin member 3. The temperature of the interface between the metal foil 1 and the first resin member 2 and the second resin member 3 rises to the vicinity of the melting point or the softening point of the first resin member 2 and the second resin member 3, at the interface with the metal foil 1, the first resin member 2 and the second resin member 3 is locally melted or softened. Accordingly, the first resin member 2 and the second resin member 3 are simultaneously welded to the first surface $S_1$ and the second surface $S_2$, respectively, of the metal foil 1. Further, in the vicinity of the end portion E1 of the metal foil 1, the first resin member 2 and the second resin member 3, respectively, since it is pressurized by the first pressurizing member 4 and the second pressurizing member 5, the first resin member 2 and the second resin member 3 is also in close contact. Also in the vicinity of the end portion E1 of the metal foil 1, the heat of the metal foil 1 is conducted to the first resin member 2 and the second resin member 3, and the first resin member 2 and the second resin member 3 are locally melted or softened. As a result, as shown in FIG. 1C, the first resin member 2 and the second resin member 3 are welded. Consequently, the end portion E1 of the metal foil 1 can be covered with the first resin member 2 and the second resin member 3. In FIG. 1C shown in the drawing, the area where the first resin member 2 and the second resin member 3 are welded to the metal foil 1 is the first welded portion 11. Further, the area where the first resin member 2 and the second resin member 3 are welded to each other in the vicinity of the end portion E1 of the metal foil 1 is the second welded portion 12.

Here, when the structure for covering the end portion of the metal foil with the resin member is manufactured using the laser bonding method, it is conceivable to dispose the resin member on the metal foil such that the end portion of the resin member is longer than the end portion of the metal foil as in the arrangement step in the present disclosure.

In the above case, for example, the resin member is disposed only on one side of the metal foil, the pressurizing member is disposed on both sides, while pressurizing with the pressurizing member on both sides, the metal foil via the pressurizing member and the resin member from one side It is conceivable case that the laser beam is irradiated. At this time, when the thickness of the metal foil is thin, in the vicinity of the end portion of the metal foil, since the resin member is pressurized by the pressurizing member on both sides, the pressurizing member located on the side opposite to the laser beam irradiation side, the resin member is easily adhered. Further, by the laser beam irradiation, the resin member tends to flow downward by melting or softening. Therefore, the resin member may also be welded to the pressurizing member located on the side opposite to the laser beam irradiation side. In this case, the product cannot be removed from the pressurizing member on the side opposite to the laser beam irradiation side.

On the other hand, according to the present disclosure, by disposing the first resin member and the second resin member on the first surface and the second surface of the metal foil, respectively, even if the thickness of the metal foil is thin, it is possible to suppress the first resin member from being welded to the second pressurizing member.

Further, in the above case, for example, the resin member is disposed on both surfaces of the metal foil, the pressurizing member is disposed on both sides, while pressurizing with the pressurizing member on both sides, the metal foil via the pressurizing member and the resin member from one side It is conceivable case where the laser beam is irradiated. At this time, if the pressurizing member located on the side opposite to the laser beam irradiation side is a member that absorbs the laser beam, the pressurizing member absorbs the laser beam and generates heat. Therefore, the resin member may be welded to the pressurizing member on the side opposite to the laser beam irradiation side. In this case, too, the product cannot be removed from the pressurizing member on the side opposite to the laser beam irradiation side.

On the other hand, according to the present disclosure, the second pressurizing member on the side opposite to the electromagnetic wave irradiation side is also transmitted through the electromagnetic wave, so that it is possible to suppress the second resin member from being welded to the second pressurizing member.

Further, in the above case, for example, the resin member is disposed on both surfaces of the metal foil, the pressurizing member is disposed on both sides, while pressurizing with the pressurizing member on both sides, when the laser beam is irradiated to the metal foil via the pressurizing member and the resin member from one side, the pressurizing member on both sides is considered a member that transmits the laser beam. At this time, if the end portion of the metal foil is not irradiated with the electromagnetic wave, the temperature of the end portion of the metal foil does not sufficiently increase. Therefore, the resin member in the vicinity of the end portion of the metal foil does not melt or soften, and the resin members are not welded to each other, so that the end portion of the metal foil may remain exposed.

On the other hand, according to the present disclosure, by irradiating the end portion of the metal foil with electromagnetic waves, the first resin member and the second resin member can be welded near the end portion of the metal foil, and the end portion of the metal foil can be covered with the first resin member and the second resin member.

Further, in the conventional laser bonding method, it is difficult to simultaneously weld the resin member to both surfaces of the metal member, it is necessary to irradiate the laser beam one side by one side. When the laser beam is irradiated from one surface of the metal member, on the surface of the metal member on the laser beam irradiation side, the metal member absorbs the laser beam to generate heat, the temperature rises. On the other hand, in the case where the thickness of the metal member is large, the temperature decreases in the heat conduction process from the surface of the metal member on the side opposite to the laser beam irradiation side. Therefore, the temperature of the surface opposite to the laser beam irradiation side of the metal member is lower than the temperature of the surface of the laser beam irradiation side of the metal member. Further, in the metal member, heat is conducted not only in the thickness direction but also in the in-plane direction, so that a large amount of heat energy is transferred in addition to the region where the resin member is to be welded to the metal member. Therefore, in the region where the resin member is to be welded to the metal member, the temperature rise is insufficient on the surface of the metal member opposite to the laser beam irradiation side. Therefore, there is a case where insufficient welding of the resin member occurs on the surface of the metal member opposite to the laser beam irradiation side.

On the other hand, according to the present disclosure, the thickness of the metal foil is within a predetermined range, and since it is thin, the heat conduction distance in the thickness direction of the metal foil can be shortened. Therefore, in the welding step, the temperature rise at the first surface and the second surface of the metal foil can be substantially the same. Therefore, by irradiating the electromagnetic wave to the metal foil from the first pressurizing member side, the first resin member and the second resin member can be simultaneously welded to the first surface and the second surface of the metal foil, respectively.

In this way, in the present disclosure, while avoiding the welding of the first resin member and the second resin member to the second pressurizing member, by the irradiation of the electromagnetic wave from the first surface of the metal foil, so as to cover the end portion of the metal foil, the first resin member and the second resin member can be welded to the metal foil. Furthermore, the first resin member and the second resin member can be simultaneously welded to both surfaces of the metal foil by the irradiation of the electromagnetic wave from the first surface of the metal foil.

As a joining method of the metal member and the resin member, a hot plate welding method typified by an impulse sealer is also known. In the hot plate welding method, the resin member is welded to the metal member by using heat conduction in the resin member. Therefore, in order to increase the temperature of the interface with the metal member, it is necessary to increase the temperature of the entire resin member. Therefore, the resin member may be melted and deformed. Further, since the thermal efficiency is poor, it is possible to weld when the thickness of the resin member is thin, if the thickness of the resin member is thick, heat is hardly transferred to the interface with the metal member, the risk of deformation of the resin member is increased. Therefore, it is necessary to secure the cooling time, and the processing time becomes long.

On the other hand, according to the present disclosure, the temperature of the interface between the metal foil and the first resin member and the second resin member increases by irradiating the metal foil with electromagnetic waves and heating the metal foil. Since only the temperature of the interface between the metal foil and the first resin member and the second resin member needs to be increased, processing can be performed in a very short time and energy saving.

1. Arrangement Step

In the arrangement step in the present disclosure, the first surface of the metal foil having a thickness of 1 μm or more and 100 μm or less, so that the end portion of the first resin member is longer than the end portion of the metal foil, a thermoplastic resin is contained, the first resin member that transmits an electromagnetic wave is arranged, and the second surface of the metal foil, the end portion of the second resin member is longer than the end portion of the metal foil, a step of disposing the second resin member that transmits an electromagnetic wave containing a thermoplastic resin.

The metal foil is not particularly limited as long as it is a metal foil used for a member constituting the power storage device. The metal foil is preferably a metal foil used for a current collector of a battery. Examples of the metal foil include nickel foil, titanium foil, stainless steel foil, aluminum foil, and copper foil. Further, as the metal foil, a metal foil coated with a coating, a metal foil multilayered by bonding with pressure bonding or bonding with an adhesive bonding a plurality of kinds of metals can also be used. The thickness of the metal foil is 1 μm or more. The thickness of the metal foil is 100 μm or less. The thickness of the metal foil may be 50 μm or less.

In addition, the first surface and the second surface of the metal foil may be degreased with alcohol or the like. When a foreign substance or the like adheres to the first surface and the second surface of the metal foil, the foreign substance can be removed.

The first resin member and the second resin member transmit electromagnetic waves. The transmittance of the electromagnetic waves of the first resin member and the second resin member is, for example, 50% or more. The transmittance of the electromagnetic waves of the first resin member and the second resin member may be 60% or more. The transmittance of the electromagnetic waves of the first resin member and the second resin member may be 80% or more. The transmittance of the electromagnetic waves of the first resin member and the second resin member may be the same. The transmittance of the electromagnetic waves of the first resin member and the second resin member may be different from each other.

The first resin member and the second resin member contain a thermoplastic resin. The thermoplastic resin contained in the first resin member and the second resin member is not particularly limited as long as it is a thermoplastic resin that transmits electromagnetic waves. The thermoplastic resin may be a crystalline resin. The thermoplastic resin may be an amorphous resin. Examples of the non-crystalline resin include polystyrene (PS), acrylonitrile styrene (AS), acrylonitrile butadiene styrene copolymer (ABS), polyetherimide (PEI), polycarbonate (PC), polyarylate (PAR), polymethyl methacrylate (PMMA), cycloolefin polymer (COP), cycloolefin copolymer (COC), polysulfone (PSF), polyethersulfone (PES), polyvinyl chloride (PVC), and polyvinyl chloride-dene (PVDC). Examples of the crystalline resin include polyethylene (PE), polyproprene (PP), polyoxymethylene (POM), polyethylene terephthalate (PET), polytrimethylene terephthalate (PTT), polybutylene terephthalate (PBT), polyethylene naphthalate (PEN), polyphenylene sulfide (PPS), nylon 6 (PA6), nylon 66 (PA66), nylon 6T (PA6T), liquid crystal polymer (LCP), and polytetrafluoroethylene (PTFE). The thermoplastic resin contained in the first resin member and the second resin member may be the same. The thermoplastic resin contained in the first resin member and the second resin member may be different from each other. The thicknesses of the first resin member and the second resin member are, for example, 50 µm or more. The thicknesses of the first resin member and the second resin member may be, for example, 1000 µm or less and 300 µm or less, respectively. The thicknesses of the first resin member and the second resin member may be the same. The thicknesses of the first resin member and the second resin member may be different from each other.

The entire first resin member and the second resin member, or at least the surface of the side in contact with the metal foil is preferably subjected to a modification treatment. Thus, the bonding between the metal foil and the first resin member and the second resin member can be strengthened. Examples of the modification treatment include acid-modified surface treatment.

In the welding step described later, the first resin member and the second resin member are simultaneously welded to the first surface and the second surface of the metal foil, respectively, by the irradiation of the electromagnetic wave from the first surface side. Therefore, the first resin member, the metal foil, and the second resin member are arranged so as to overlap each other in a plan view viewed from the normal direction of the first surface of the metal foil. The first resin member and the second resin member may have the same size and shape. The first resin member and the second resin member may have different sizes and shapes.

The first resin member is disposed on the first surface of the metal foil such that the end portion of the first resin member is longer than the end portion of the metal foil. The distance between the end portion of the metal foil and the end portion of the first resin member, and the distance between the end portion of the metal foil and the end portion of the second resin member are, for example, 0.5 mm or more, and may be 10 mm or more. The upper limit of the distance is not particularly limited. The distance between the end portion of the metal foil and the end portion of the first resin member and the distance between the end portion of the metal foil and the end portion of the second resin member may be the same. The distance between the end portion of the metal foil and the end portion of the first resin member and the distance between the end portion of the metal foil and the end portion of the second resin member may be different from each other. The "end portion of the first resin member" is an end portion of the first resin member located outside the end portion of the metal foil. Further, the "end portion of the second resin member" is an end portion of the second resin member located outside the end portion of the metal foil.

2. Welding Step

In the welding step of the present disclosure, a first pressurizing member that transmits an electromagnetic wave is disposed on a surface of the first resin member opposite to the surface on the metal foil side, a second pressurizing member that transmits an electromagnetic wave is disposed on a surface of the second resin member opposite to the surface on the metal foil side, and the first pressurizing member and the second pressurizing member are pressed to irradiate an end portion of the metal foil with an electromagnetic wave from the first pressurizing member side, so as to cover an end portion of the metal foil, the first resin member and the second resin member are welded to the metal foil.

The first pressurizing member and the second pressurizing member transmit electromagnetic waves. The transmittance of the electromagnetic waves of the first pressurizing member and the second pressurizing member is, for example, 50% or more. The transmittance of the electromagnetic waves of the first pressurizing member and the second pressurizing member may be 60% or more. The transmittance of the electromagnetic waves of the first pressurizing member and the second pressurizing member may be 80% or more. The transmittance of the electromagnetic waves of the first pressurizing member and the second pressurizing member may be the same. The transmittance of the electromagnetic waves of the first pressurizing member and the second pressurizing member may be different from each other.

The materials of the first pressurizing member and the second pressurizing member are not particularly limited as long as they are materials that transmit electromagnetic waves. However, since the transmittance and the thermal conductivity of the electromagnetic wave are high, the material of the first pressurizing member and the second pressurizing member is preferably glass. When the first pressurizing member and the second pressurizing member are made of glass, the thicknesses of the first pressurizing member and the second pressurizing member are, for example, 1 mm or more and 40 mm or less, respectively. The thicknesses of the first pressurizing member and the second pressurizing member may be identical. The thicknesses of the first pressurizing member and the second pressurizing member may be different from each other.

In a plan view viewed from the normal direction of the first surface of the metal foil, the first pressurizing member and the second pressurizing member are disposed so as to overlap the first resin member, the metal foil, and the second resin member. The size of the first pressurizing member and the second pressurizing member, the region for welding the first resin member and the second resin member to the metal foil, the region for welding the first resin member and the second resin member in the vicinity of the end portion of the metal foil, it is preferable to be larger than the combined size. Pressurization by the first pressurizing member and the second pressurizing member, while the first resin member and the second resin member is brought into close contact with the metal foil, the first resin member and the second resin member in the vicinity of the end portion of the metal foil it is possible to close contact.

Examples of the electromagnetic wave include laser light and infrared light. Among them, laser light is preferable. The processing time can be shortened. Examples of the laser beam include a semiconductor laser, a YAG laser, and a fiber laser. Further, the laser beam is preferably an infrared laser. The irradiation condition of the electromagnetic wave (the output of the electromagnetic wave, the energy density, the irradiation time, and the like) is not particularly limited as long as the first resin member and the second resin member can be welded to the metal foil and the first resin member and the second resin member can be welded in the vicinity of the end portion of the metal foil. The irradiation condition (the output of the electromagnetic wave, the energy density, the irradiation time, and the like) of the electromagnetic wave is appropriately set in accordance with the transmittance of the electromagnetic wave of the first resin member, the second resin member, the first pressurizing member, and the second pressurizing member, and the thermal conductivity of the metal foil. By appropriately adjusting the irradiation conditions of the electromagnetic wave to control the temperature of the interface between the metal foil and the first resin member and the second resin member, it is possible to suppress insufficient welding of the first resin member and the second resin member. Further, it is possible to suppress the welding of the first resin member to the first pressurizing member and the welding of the second resin member to the second pressurizing member. Further, it is possible to control the distance between the end portion of the metal foil and the end portion of the region (second welding portion) where the first resin member and the second resin member are welded. For example, 0.2 W/mm² or more, and 1.8 W/mm² or less. Irradiation times are, for example, 0.8 sec or more and 1.8 sec or less.

The electromagnetic wave may be irradiated from a region where the metal foil and the first resin member and the second resin member overlap to an end portion of the metal foil. For example, as shown in 1B, the electromagnetic wave is preferably irradiated from a region where the metal foil 1 and the first resin member 2 and the second resin member 3 overlap to a region outside the end portion E1 of the metal foil 1. Specifically, it is preferable that the electromagnetic wave is irradiated from a region where the metal foil and the first resin member and the second resin member overlap to a region which is 0.5 mm or more outward from the end portion of the metal foil. In this case, the electromagnetic wave can be easily irradiated to the end portion of the metal foil. Further, regardless of the intensity distribution of the electromagnetic wave, the temperature of the end portion of the metal foil can be easily raised to the vicinity of the melting point or the softening point of the first resin member and the second resin member by the irradiation of the electromagnetic wave. Examples of the method of irradiating the electromagnetic wave include a method of irradiating a region where the first resin member and the second resin member are welded to the metal foil and a region where the first resin member and the second resin member are welded in the vicinity of the end portion of the metal foil at once, and a method of scanning and irradiating the beam. In the former method, a beam profile of the same size as the region is shaped with a beam homogenizer and irradiated at once.

Further, the pressing condition (pressing force or the like) by the first pressurizing member and the second pressurizing member is not particularly limited as long as the first resin member and the second resin member are brought into close contact with the metal foil and the first resin member and the second resin member can be brought into close contact with each other in the vicinity of the end portion of the metal foil. The pressing conditions (pressing force, etc.) by the first pressurizing member and the second pressurizing member are appropriately set according to the strength, hardness, etc. of each member. The pressing force is, for example, 0.01 MPa or more.

In the welding step, the first resin member and the second resin member are welded so as to cover the end portion of the metal foil. Therefore, for example, as shown in 1C, the end portion E4 of the area where the first resin member 2 and the second resin member 3 are welded (the second welded portion 12) is located outward from the end portion E1 of the metal foil 1. The end portion of the metal foil and the end portion of the second welded portion are, for example, 0.5 mm or more. The end portion of the metal foil and the end portion of the second welded portion may be, for example, 1 mm or more. The upper limit of the distance is equal to or less than the distance between the end of the metal foil and the end of the first resin member or the second resin member, and is not particularly limited. The "region where the first resin member and the second resin member are welded", that is, the "second welded portion" is a region where the first resin member and the second resin member are welded to each other in a region outside the end portion of the metal foil. Further, the "end portion of the region where the first resin member and the second resin member are welded" is an end portion of the region where the first resin member and the second resin member are welded, which is located on the side opposite to the end portion side of the metal foil.

3. Power Storage Device

In the present disclosure, the power storage device is, for example, a power storage module. The power storage device may be, for example, a secondary battery such as a nickel-hydrogen secondary battery or a lithium-ion secondary battery. The power storage device may be a capacitor such as an electric double layer capacitor.

Figure 2:
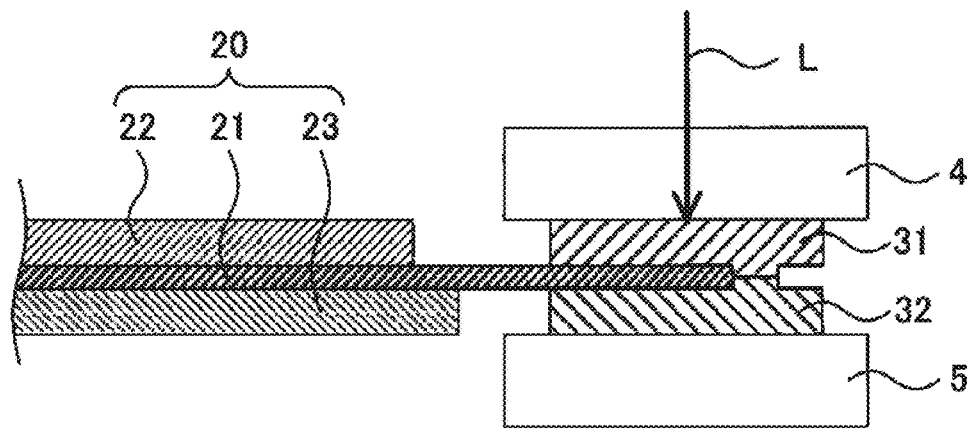
FIG. 2 is a schematic cross-sectional view illustrating a welding step in the present disclosure.

In the present disclosure, the metal foil is not particularly limited as long as it is a member constituting the power storage device. However, it is preferred that the metal foil is a current collector of a battery. The first resin member and the second resin member are not particularly limited as long as they are members constituting the power storage device. However, it is preferable that the first resin member and the second resin member are frame-shaped resin portions that are disposed on the peripheral edge portion of the current collector and insulate the adjacent current collectors from each other. Specifically, in the manufacturing method of a power storage device in which bipolar electrodes are stacked via separators, the above-described arrangement step and welding step are preferably applied to the step of welding frame-shaped resin portions 31 and 32 to the peripheral edge portions of both surfaces of the current collector 21 so as to cover the end portions of the current collector 21 of the bipolar electrode 20 in which the positive electrode 22 and the negative electrode 23 are disposed on both surfaces of the current collector 21, respectively, as shown in FIG. 2. According to the present disclosure, such a structure can be easily manufactured by irradiation of an electromagnetic wave from one side.

In the manufacturing method of the power storage device, a general step in the manufacturing method of the power storage device can be applied to a step other than the arrangement step and the welding step described above.

Applications of power storage devices include, for example, hybrid electric vehicle (HEV), plug-in hybrid electric vehicle (PHEV), battery electric vehicle (BEV), gasoline-powered vehicles, and power supplies for vehicles such as diesel-powered vehicles. The power storage device is preferably used as a power source for driving hybrid electric vehicle (HEV), plug-in hybrid electric vehicle (PHEV) or battery electric vehicle (BEV). Further, the power storage device in the present disclosure may be used as a power source for a moving object (for example, a railway, a ship, or an aircraft) other than a vehicle. The power storage device according to the present disclosure may be used as a power source for an electric product such as an information processing device.

Hereinafter, examples will be shown and the present disclosure will be further described.

Examples 1 to 8 and Comparative Example 1

A 50 mm×30 mm rectangular shape having a thickness of 66 μm, an aluminum-based metal foil, a 50 mm×10.5 mm rectangular shape having a thickness of 200 μm, and a polypropylene-containing acid-modified first resin member and a second resin member were prepared. As shown in 3A, the first resin member 2 and the second resin member 3 were disposed on both surfaces of the metal foil 1, respectively. At this time, the area where the metal foil 1 overlaps the first resin member 2 and the second resin member 3 was 50 mm×8 mm. The distance between the end portion of the metal foil 1 and the end portion of the first resin member 2 and the distance between the end portion of the metal foil 1 and the end portion of the second resin member 3 were both 2.5 mm.

Further, a first pressurizing member and a second pressurizing member made of heat-resistant crystallized glass were prepared. The first pressurizing member was disposed on a surface of the first resin member opposite to the metal foil side. The second pressurizing member was disposed on a surface of the second resin member opposite to the metal foil side. While pressurizing the first pressurizing member and the second pressurizing member, using a semiconductor laser oscillator and a beam homogenizer, the laser beam from the first pressurizing member side was irradiated. The irradiation conditions and pressurization conditions of the laser beam are shown in Table 1. The laser beam was irradiated with the head fixed.

Evaluation

Figure 3A:
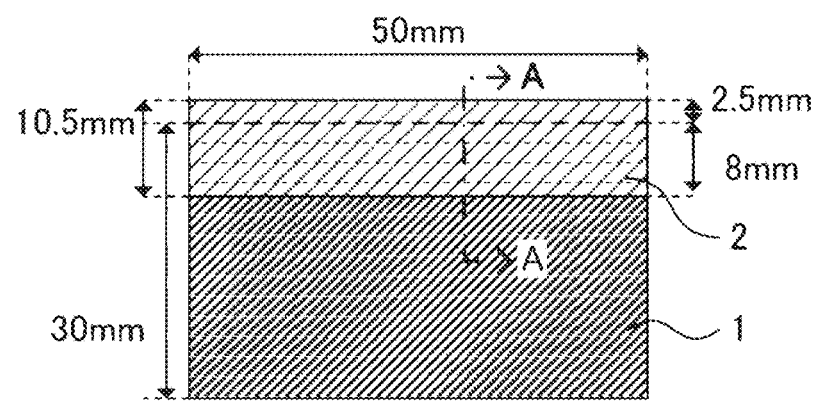
FIG. 3A is a schematic plan view illustrating the arrangement steps in the examples and comparative examples.
Figure 3B:
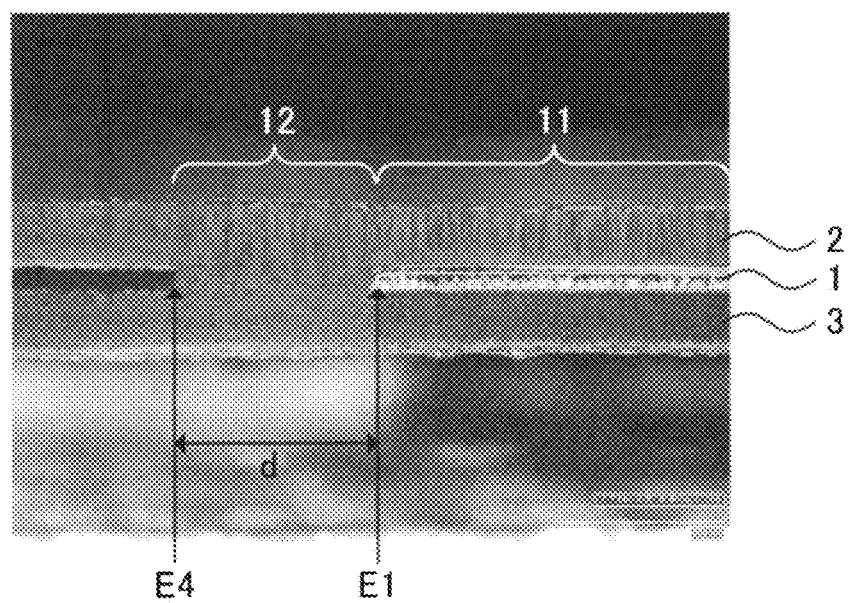
FIG. 3B is an optical micrograph of Example 4.

Distance between the end of the metal foil and the end of the region (2 welding portion) where the first resin member and the second resin member are welded The resulting laminate was cut in the lateral direction (FIG. 3A A-A line direction in) of the area where the first resin member and the second resin member are welded to the metal foil (first welded portion). The distance between the end portion of the metal foil and the end portion of the second welded portion was measured on the cut surface by optical microscope observation. The n number was 3, and the average value was obtained. The results are shown in Table 1. In addition, an optical micrograph of Embodiment 4 is shown in FIG. 3B. FIG. 3B corresponds to an A-A section of FIG. 3A. In FIG. 3B of the drawing, the end portion E1 of the metal foil 1 and the end E4 of the second welded portion 12 are indicated by d.

each other, and the bonding strength (shear strength) was measured. The bonding strength between the metal foil and the first resinous member (laser-irradiated side) was 37.3N/10 mm. The bonding strength between the metal foil and the second resinous member (opposite to the laser-irradiated side) was 37.5N/10 mm. In the shear test, the resin base material has started to elongate, by laser irradiation from one side, both surfaces of the metal foil resin member with a strength higher than the strength of the base material was confirmed to be bonded.

The same results as in Example 4 were obtained for the other examples.

In Examples 1 to 8, by the irradiation of the laser beam from the first surface of the metal foil, while avoiding the welding to the pressurizing member of the resin member, while covering the end portion of the metal foil with the first resin member and the second resin member, the first resin member and the second resin member on the first surface and the second surface of the metal foil respectively it was confirmed that can be welded simultaneously.

On the other hand, in Comparative Example 1, the end portion of the metal foil could not cover the first resin member and the second resin member. In addition, insufficient welding of the first resin member and the second resin member to the metal foil has also occurred. This is considered to be due to insufficient temperature rise of the metal foil due to low laser power, short irradiation time, and low energy density.

Further, by adjusting the irradiation conditions of the laser beam, it was confirmed that it is possible to control the distance between the end portion of the metal foil and the end portion of the second welding portion.

The present disclosure is not limited to the above embodiments. The above embodiment is an example. Any device having substantially the same configuration as the technical idea described in the claims in the present disclosure and having the same operation and effect is included in the technical scope of the present disclosure.

TABLE 1

|  | Beam width [mm] | Beam depth [mm] | Output [W] | Irradiation time [msec] | Energy density [W/mm$^2$] | Pressure [MPa] | Distance between the end of the metal foil and the end of the 2 weld portion [μm] |
| --- | --- | --- | --- | --- | --- | --- | --- |
| Example 1 | 42 | 14 | 396 | 800 | 0.673 | 0.21 | 583.0 |
| Example 2 | 42 | 14 | 330 | 800 | 0.561 | 0.21 | 112.4 |
| Comparative Example 1 | 42 | 14 | 264 | 800 | 0.449 | 0.21 | 0.0 |
| Example 3 | 42 | 14 | 396 | 1000 | 0.673 | 0.21 | 747.6 |
| Example 4 | 42 | 14 | 330 | 1000 | 0.561 | 0.21 | 209.3 |
| Example 5 | 42 | 14 | 264 | 1000 | 0.449 | 0.21 | 196.6 |
| Example 6 | 42 | 14 | 396 | 1200 | 0.673 | 0.21 | 1120.5 |
| Example 7 | 42 | 14 | 330 | 1200 | 0.561 | 0.21 | 419.5 |
| Example 8 | 42 | 14 | 264 | 1200 | 0.449 | 0.21 | 182.8 |

Bonding Strength

For Example 4, the resulting laminate was cut out with a 10 mm width in the lateral direction of the area where the first resin member and the second resin member are welded to the metal foil (first welded portion), and was measured as a sample. The measurement sample was subjected to a shear test in which the metal foil and the first resin member or the second resin member were pulled in opposite directions to

What is claimed is:

1. A manufacturing method of a power storage device, the manufacturing method comprising:
    an arrangement step of arranging a first resin member that contains a thermoplastic resin and that transmits an electromagnetic wave, on a first surface of a metal foil with a thickness of 1 μm or more and 100 μm or less, the first resin member being arranged such that an end portion of the first resin member is longer than an end portion of the metal foil, and arranging a second resin member that contains a thermoplastic resin and that transmits an electromagnetic wave, on a second surface of the metal foil, the second resin member being arranged such that an end portion of the second resin member is longer than the end portion of the metal foil; and a welding step of arranging a first pressurizing member that transmits an electromagnetic wave on a surface on an opposite side of the first resin member from a surface on the metal foil side, arranging a second pressurizing member that transmits an electromagnetic wave on a surface on an opposite side of the second resin member from a surface on the metal foil side, and irradiating the end portion of the metal foil with an electromagnetic wave from the first pressurizing member side while pressurizing the end portion with the first pressurizing member and the second pressurizing member so as to weld the first resin member and the second resin member to the metal foil such that the end portion of the metal foil is covered.

2. The manufacturing method according to claim 1, wherein in the arrangement step, a distance between the end portion of the metal foil and the end portion of the first resin member and a distance between the end portion of the metal foil and the end portion of the second resin member are equal to or greater than 0.5 mm.

3. The manufacturing method according to claim 1, wherein the metal foil is a current collector of a battery.

* * * * *